(12) United States Patent
Lee et al.

(10) Patent No.: US 12,270,656 B2
(45) Date of Patent: Apr. 8, 2025

(54) LOCATION DETERMINATION METHOD AND ELECTRONIC DEVICE FOR SUPPORTING SAME

(71) Applicant: Samsung Electronics Co., Ltd., Suwon-si (KR)

(72) Inventors: Youngpo Lee, Suwon-si (KR); Taeyoon Kim, Suwon-si (KR); Dukhyun Chang, Suwon-si (KR); Hyeonggeon Lee, Suwon-si (KR); Hyoungjoo Lee, Suwon-si (KR); Chaeman Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 283 days.

(21) Appl. No.: 17/903,650

(22) Filed: Sep. 6, 2022

(65) Prior Publication Data

US 2023/0003529 A1 Jan. 5, 2023

Related U.S. Application Data

(63) Continuation of application No. PCT/KR2021/002761, filed on Mar. 5, 2021.

(30) Foreign Application Priority Data

Mar. 5, 2020 (KR) .................... 10-2020-0027954

(51) Int. Cl.
*G01C 21/00* (2006.01)
*G01C 21/16* (2006.01)
(Continued)

(52) U.S. Cl.
CPC ....... *G01C 21/1654* (2020.08); *G01C 21/206* (2013.01)

(58) Field of Classification Search
None
See application file for complete search history.

(56) References Cited

U.S. PATENT DOCUMENTS 10,477,506 B2 11/2019 Lee et al.
10,832,552 B2 11/2020 Jang et al.
(Continued)

FOREIGN PATENT DOCUMENTS

JP 2011-108137 6/2011
JP 2017-58321 3/2017
(Continued)

OTHER PUBLICATIONS

International Search Report for PCT/KR2021/002761, dated Jun. 17, 2021, 3 pages.
(Continued)

*Primary Examiner* — Yonel Beaulieu
*Assistant Examiner* — Laura E Linhardt
(74) *Attorney, Agent, or Firm* — Nixon & Vanderhye P.C.

(57) ABSTRACT

An electronic device may include a magnetic sensor and at least one processor. The at least one processor may be configured to: collect path data based on first magnetic data related to movement of the electronic device, by using the magnetic sensor; identify a plurality of pieces of second magnetic data, which have at least a predetermined level of mutual similarity, from among the path data; determine, to be an intersection area related to the movement of the electronic device, an area range in which the plurality of pieces of second magnetic data are collected; determine, on the basis of the intersection area, a first space and a second space related to the movement of the electronic device; and determine, on the basis of third magnetic data, the space in which the electronic device is located from among the first space and the second space.

20 Claims, 14 Drawing Sheets

(51) Int. Cl.
  *G01C 21/20* (2006.01)
  *G06K 9/20* (2006.01)

(56) References Cited

U.S. PATENT DOCUMENTS

| | | |
|---|---|---|
| 2013/0057260 A1 | 3/2013 | Kim et al. |
| 2013/0177208 A1 | 7/2013 | Haverinen |
| 2014/0379256 A1 | 12/2014 | Stipes et al. |
| 2015/0260523 A1 | 9/2015 | Haverinen |
| 2015/0378045 A1 | 12/2015 | Kim et al. |
| 2016/0116290 A1* | 4/2016 | Haverinen ............. G01C 21/14 701/525 |
| 2017/0082440 A1 | 3/2017 | Ninomiya et al. |
| 2017/0082725 A1 | 3/2017 | Haverinen et al. |
| 2017/0180948 A1 | 6/2017 | Haverinen et al. |
| 2021/0207974 A1* | 7/2021 | Zhou .................... G01C 21/206 |

FOREIGN PATENT DOCUMENTS

| | | |
|---|---|---|
| JP | 6194521 | 9/2017 |
| KR | 10-2013-0025484 | 3/2013 |
| KR | 10-2013-0063821 | 6/2013 |
| KR | 10-2016-0049447 | 5/2016 |
| KR | 10-1879366 | 7/2018 |
| KR | 10-1971734 | 4/2019 |

OTHER PUBLICATIONS

Written Opinion of the ISA for PCT/KR2021/002761, dated Jun. 17, 2021, 4 pages.
Shu et al, "Magicol: Indoor Localization Using Pervasive Magnetic Field and Opportunistic Wifi Sensing", IEEE Journal on Selected Areas in Communications, 2015.

\* cited by examiner

| Virtual mark 510 | | | | |
|---|---|---|---|---|
| Sampling Rate | | Duration | | |
| Timestamp 1 | MagX$_1$ | MagY$_1$ | MagZ$_1$ | |
| : | : | : | : | |
| Timestamp N | MagX$_N$ | MagY$_N$ | MagZ$_N$ | |
| Sampling Rate | | Duration | | |
| Timestamp 1 | AccX$_1$ | AccY$_1$ | AccZ$_1$ | |
| : | : | : | : | |
| Timestamp N | AccX$_N$ | AccY$_N$ | AccZ$_N$ | |

| Sampling Rate | Duration | | | | | |
|---|---|---|---|---|---|---|
| Timestamp 1 | Roll$_1$ | Pitch$_1$ | Yaw$_1$ | AnvX$_1$ | AnvY$_1$ | AnvZ$_1$ |
| Timestamp 2 | : | : | : | : | : | : |
| Timestamp N | Roll$_N$ | Pitch$_N$ | Yaw$_N$ | AnvX$_N$ | AnvY$_N$ | AnvZ$_N$ |
| Number of WLAN Aps | | | | | | |
| AP1 signal strength | ... | | APN signal strength | | | |
| Number of Cell Number | | | | | | |
| Cell1 signal strength | ... | | CellN signal strength | | | |

- Magnetic sensing value 520
- Acceleration sensing value 530
- Gyro sensing value 540
- First wireless communication signal 550
- Second wireless communication signal 560

FIG.5B

LOCATION DETERMINATION METHOD AND ELECTRONIC DEVICE FOR SUPPORTING SAME

CROSS-REFERENCE TO RELATED APPLICATIONS

This application is a continuation of International Application No. PCT/KR2021/002761, designating the United States, filed on Mar. 5, 2021, in the Korean Intellectual Property Receiving Office and claiming priority to Korean Patent Application No. 10-2020-0027954, filed on Mar. 5, 2020, the disclosures of which are incorporated by reference herein in their entireties.

BACKGROUND

Field

Various example embodiments disclosed herein relate to a location determination method and/or an electronic device supporting the same.

Description of Related Art

Electronic devices provide various functions or services based on convergence of various kinds of information/communication technologies, also referred to as digital convergence. For example, an electronic device may track the position of the electronic device (or user holding the electronic device) with regard to an indoor space, and may provide an event related to the corresponding position, thereby supporting a position-based service.

In connection with position tracking regarding an indoor space, an electronic device may use radio signals (for example, cellular signals, Wi-Fi signals, or Bluetooth signals) received in the indoor space. For example, the electronic device may divide the indoor space into multiple cells, may record characteristics of radio signals received in respective cells as feature points related to the corresponding cells, and may determine the degree of similarity between characteristics of radio signals received in a specific cell and feature points recorded with regard to the corresponding cell, thereby tracking the position of the electronic device.

Based thereon, construction of a radio map reflecting radio signals characteristics regarding the multiple cells is a prerequisite for a radio signal-based position tracking scheme, and construction of such a radio map may involve survey (or calibration) costs for collecting radio signals. In addition, if a base station or an access point related to radio signals undergoes a change (for example, replacement or displacement), maintenance/repair costs for updating the radio map, for example, may be incurred.

SUMMARY

Various example embodiments disclosed herein may provide a position determination method and an electronic device supporting the same, wherein the position of an electronic device existing in an indoor space can be tracked without constructing a map regarding the indoor space.

An electronic device according to an example embodiment may include a magnetic sensor and at least one processor operatively connected with the magnetic sensor.

According to an example embodiment, the processor (at least one processor) may collect multiple pieces of path data based on at least first magnetic data related to multiple movements of the electronic device, by using at least the magnetic sensor, identify multiple pieces of second magnetic data, which are similar to each other at a predetermined level or higher, from among the multiple pieces of path data, determine an area range, in which the multiple pieces of second magnetic data are collected, to be an intersection area related to the multiple movements of the electronic device, determine a first space and a second space related to the multiple movements of the electronic device based on at least the intersection area, and determine a space, in which the electronic device is located, among the first space and the second space based on at least third magnetic data acquired using at least the magnetic sensor.

A positioning method by an electronic device according to an example embodiment may include collecting multiple pieces of path data based on first magnetic data related to multiple movements of the electronic device by using a magnetic sensor, identifying multiple pieces of second magnetic data, which are similar to each other at a predetermined level or higher, from among the multiple pieces of path data, determining an area range, in which the multiple second magnetic data are collected, to be an intersection area related to the multiple movements of the electronic device, determining a first space and a second space related to the multiple movements of the electronic device based on the intersection area, and determining a space, in which the electronic device is located, among the first space and the second space based on third magnetic data acquired using the magnetic sensor.

According to various example embodiments, a position tracking platform not requiring construction of a map regarding an indoor space may be provided.

Various other advantageous effects identified explicitly or implicitly through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 5B illustrates an example of a virtual marker according to an example embodiment;

In connection with the description of the drawings, the same reference numerals may be assigned to the same or corresponding elements.

DETAILED DESCRIPTION

Hereinafter, various example embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. Each embodiment herein may be used in combination with any other embodiment(s).

Figure 1:
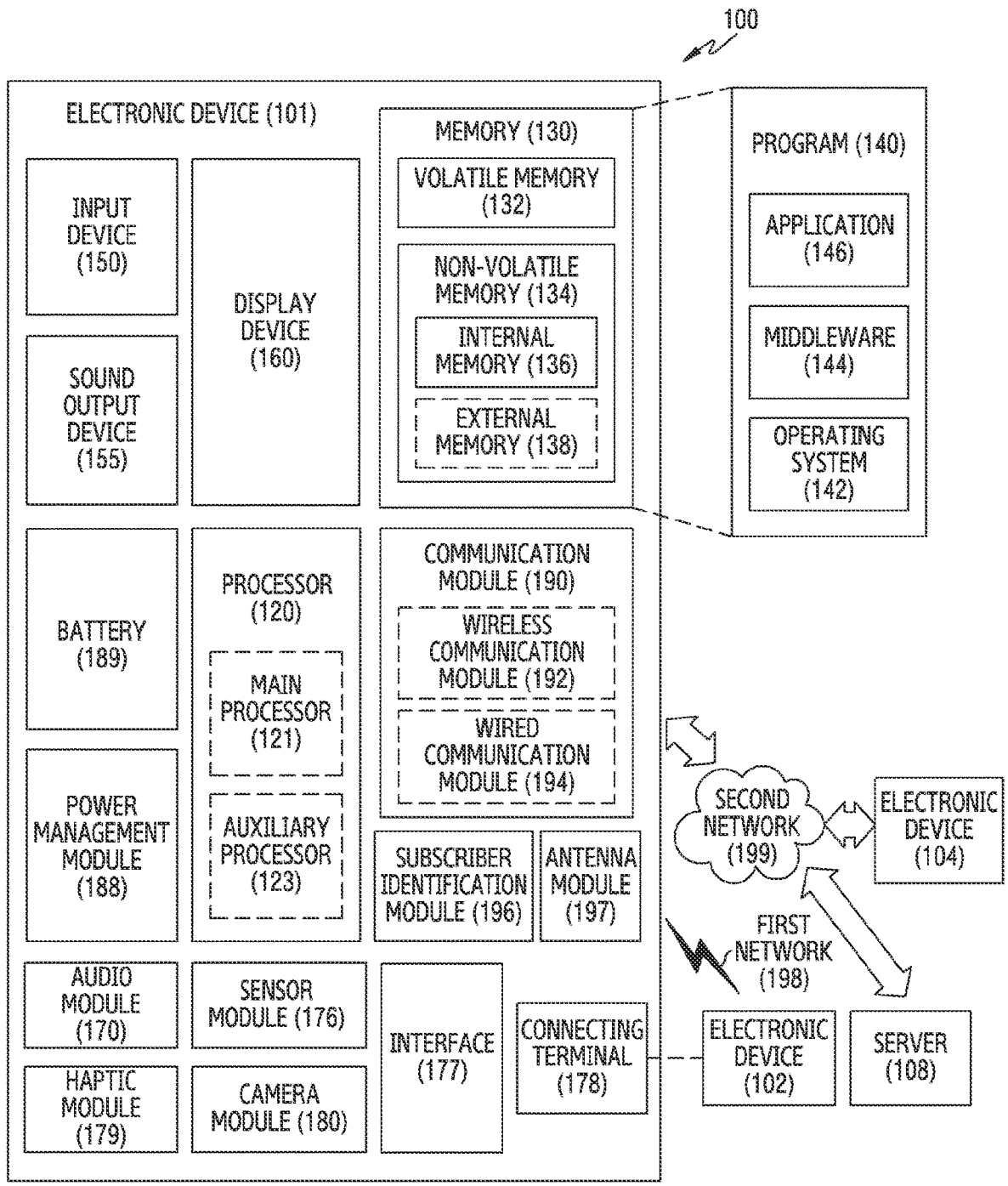
FIG. 1 illustrates an electronic device in a network environment according to an example embodiment.

FIG. 1 illustrates an electronic device in a network environment according to an example embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134 (which may include internal memory 136 and/or external memory 138). According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121. Each processor herein includes processing circuitry, and each processing unit herein includes processing circuitry.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. Each "module" herein may comprise circuitry.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 (including communication circuitry) may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196 (including communication circuitry).

The antenna module 197 (including an antenna) may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
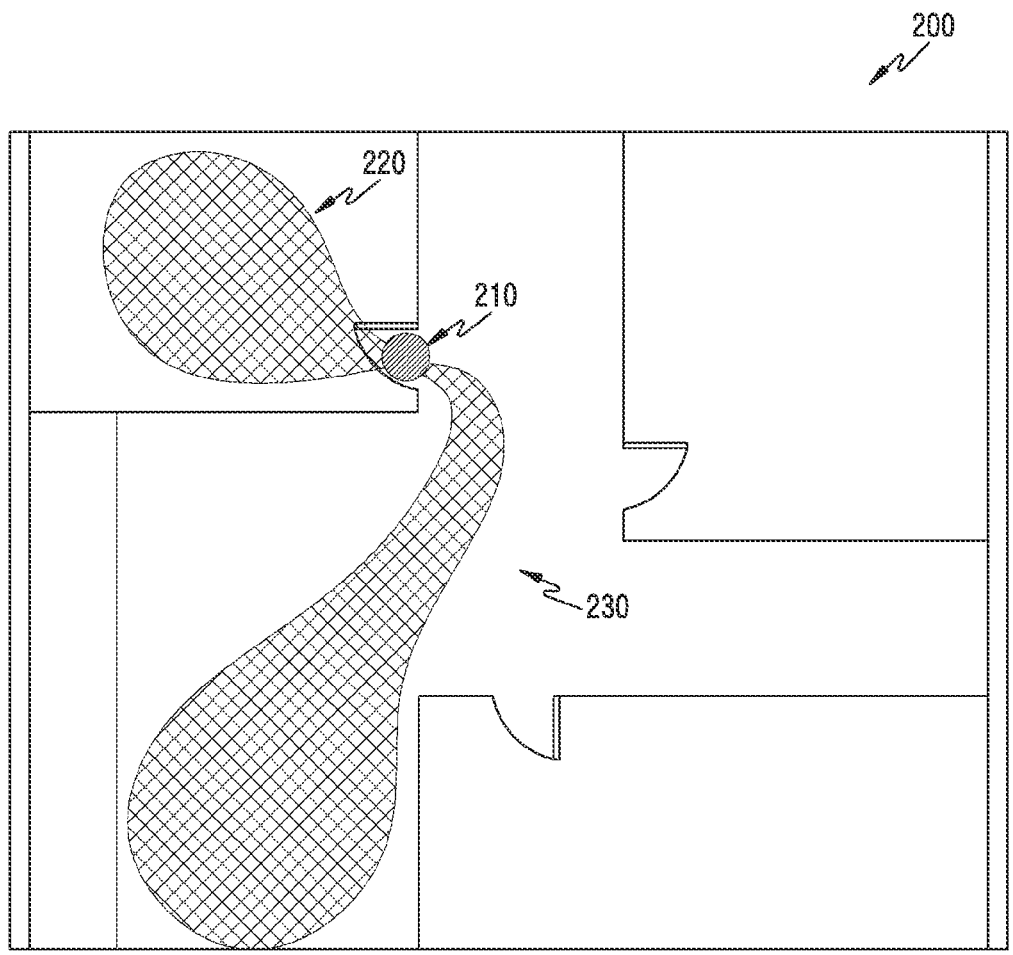
FIG. 2 illustrates an operating environment of an electronic device according to an example embodiment.

FIG. 2 illustrates an operating environment of an electronic device according to an embodiment.

Referring to FIG. 2, a processor (e.g., the processor 120 of FIG. 1) of an electronic device (e.g., the electronic device 101 of FIG. 1) according to an embodiment may be configured to determine the location of the electronic device 101 (or a user who possesses the electronic device 101) with respect to a designated indoor space 200 (e.g., an indoor space configured in the electronic device 101 through an application for supporting a location-based service). In this regard, the processor 120 may be configured to collect multiple pieces of data, which are acquired in the indoor space 200, as background data during a designated period. For example, the processor 120 may be configured to collect data with respect to each of multiple paths of the electronic device 101 moving between a first zone and a second zone within a preconfigured indoor space. For example, the processor 120 may be configured to collect pieces of data, which are acquired on a first path of the electronic device 101 at a designated time interval, as first path data, and similarly, may collect pieces of data, which are acquired on a second path of the electronic device 101 at the designated time interval, as second path data, so as to collect multiple pieces of data including the first path data and the second path data.

In an embodiment, the processor 120 may be configured to determine an intersection area for the multiple paths based on at least multiple pieces of data collected with respect to each of the multiple paths of the electronic device 101. For example, the processor 120 may be configured to identify multiple pieces of first data having a similarity, which is equal to or greater than a designated level, between pieces of data configuring the first path data and pieces of data configuring the second path data, and determine an area within the indoor space, in which the multiple pieces of first data are collected, as an intersection area 210 for the first path and the second path of the electronic device 101.

In an embodiment, the processor 120 may be configured to spatially partition the multiple pieces of data collected from each of the multiple paths of the electronic device 101 based on at least the determined intersection area 210. In this regard, the processor 120 may be configured to process the multiple pieces of collected data. For example, the processor 120 may be configured to process magnetic data, which is collected using a magnetic sensor (e.g., a magnetic sensor including the sensor module 176 of FIG. 1), into a magnetic field component in the X-axis direction (e.g., X direction of FIG. 5A), a magnetic field component in the Y-axis direction (e.g., Y direction of FIG. 5A), and a magnetic field component in the Z-axis direction (e.g., Z direction in FIG. 5A) with reference to the electronic device 101. The processor 120 may be configured to spatially arrange the processed magnetic data on a vector space (e.g., a vector space corresponding to the indoor space 200) represented by the X-axis, Y-axis, and Z-axis, and may be configured to group multiple pieces of second data having mutually identical and/or similar first distribution characteristics (e.g., directionality or adjacency of spatially arranged pieces of data) with reference to the intersection area 210 (or multiple pieces of first data corresponding to the intersection area 210) into a first group and to group multiple pieces of third data having a second distribution characteristic different from the first distribution characteristic into a second group.

The processor 120 may be configured to determine a range of an area, in which multiple pieces of second data included in the first group are collected, as a first space 220 in the indoor space 200, and similarly determine a range of an area, in which multiple pieces of third data included in the second group are collected, as a second space 230 in the indoor space 200.

In an embodiment, after determination of the first space 220 and the second space 230, the processor 120 may be configured to determine a space, in which the electronic device 101 is located within the indoor space 200, based on at least data acquired by the electronic device 101. For example, when the acquired data is similar to at least part of the multiple pieces of second data corresponding to the first space 220 at a designated level or higher, the processor 120 may be configured to determine that the electronic device 101 is located in the first space 220 within the indoor space 200. The processor 120 may be configured to provide an event configured for the first space 220 in which the electronic device 101 is located, in response to determining the location of the electronic device 101. For example, the processor 120 may be configured to output an alarm based on voice, text, image, or a combination thereof. As another example, the processor 120 may be configured to control a function (e.g., turn on a light) of an external electronic device existing within the first space 220 in which the electronic device 101 is located, among at least one external electronic device constructing an Internet of Things (IoT) environment with the electronic device 101.

Hereinafter, referring to FIGS. 3 to 12, based on spatial partition of multiple pieces of data collected from multiple paths of the electronic device 101, various embodiments related to determining the location of the electronic device 101 in the indoor space 200 will be described.

Figure 3:
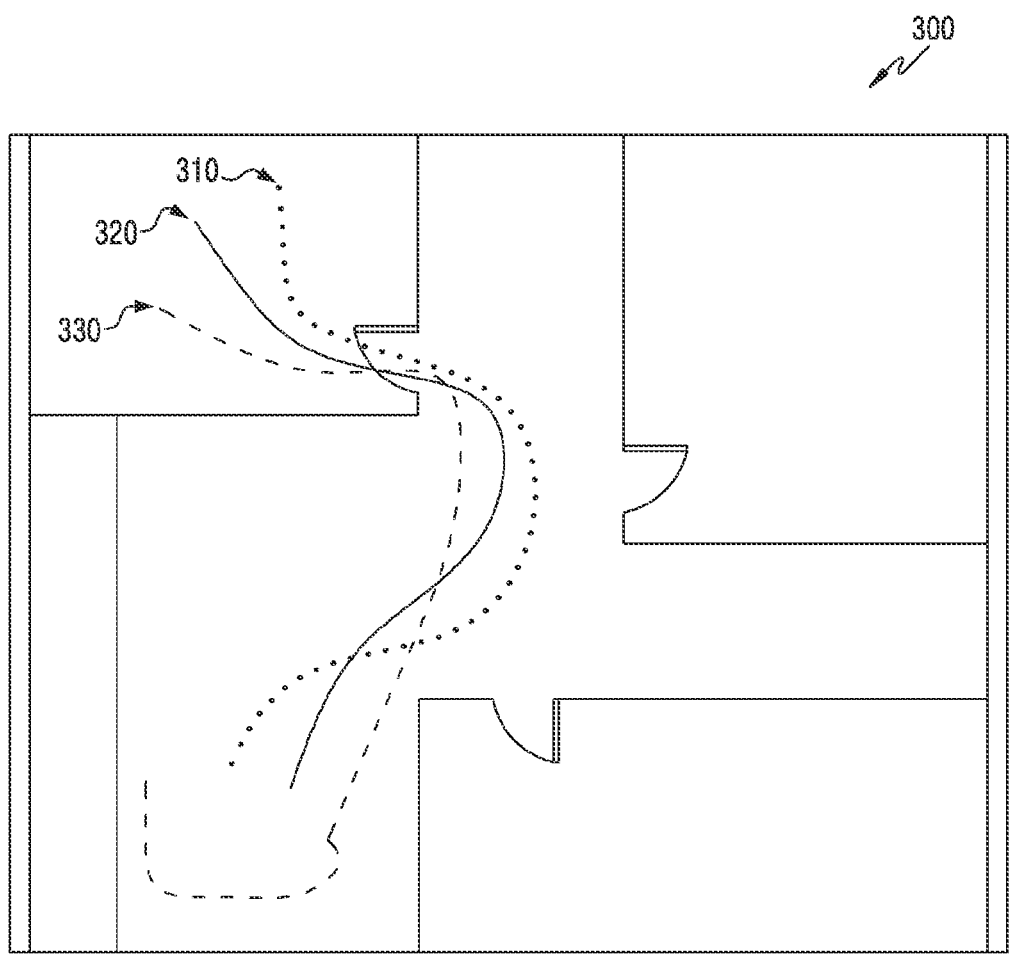
FIG. 3 illustrates various traveling paths of an electronic device moving between designated zones in an indoor space according to an example embodiment.
Figure 4:
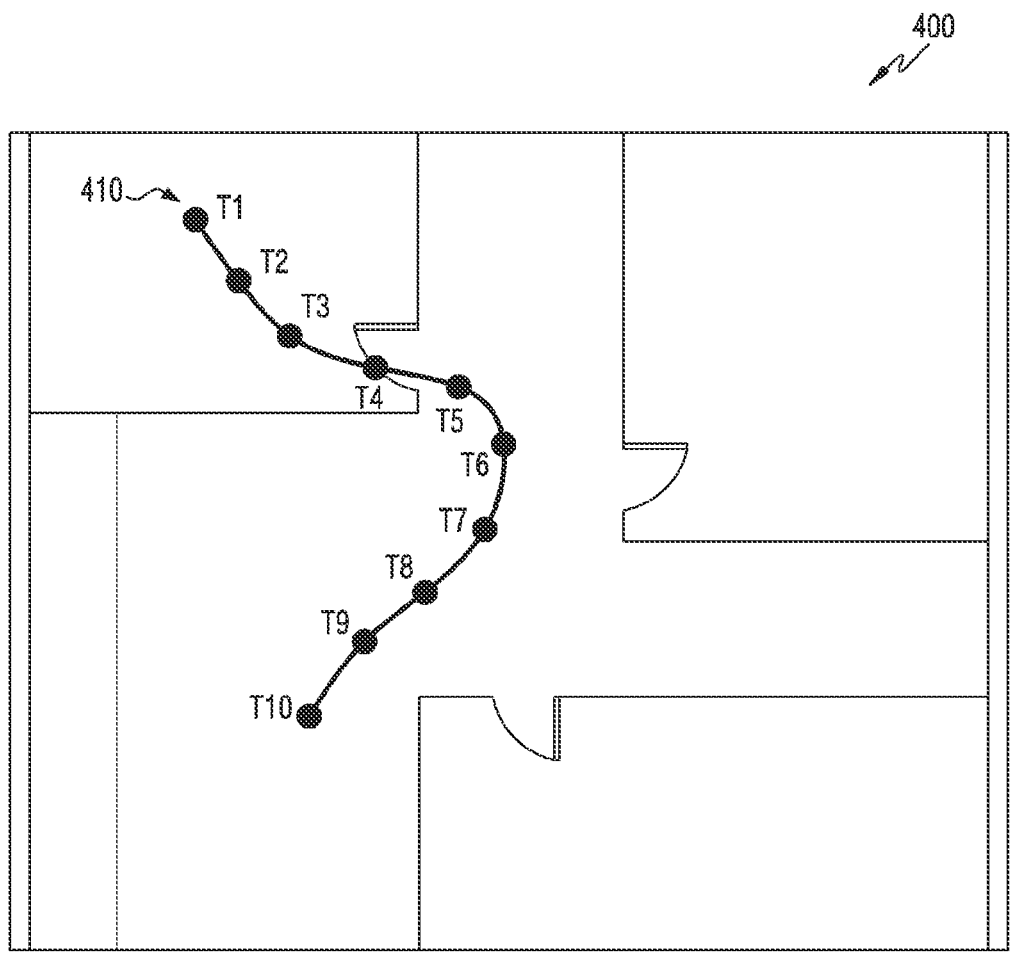
FIG. 4 illustrates the form of data collection with regard to a traveling path of an electronic device according to an example embodiment.

FIG. 3 illustrates various traveling paths of an electronic device moving between designated zones in an indoor space according to an embodiment, and FIG. 4 illustrates the form of data collection with regard to a traveling path of an electronic device according to an embodiment.

Referring to FIGS. 3 and 4, a processor (e.g., the processor 120 of FIG. 1) of an electronic device (e.g., the electronic device 101 of FIG. 1) according to an embodiment may be configured to collect pieces of data from each of multiple paths 310, 320, and 330 of the electronic device 101 moving between a first zone and a second zone within an indoor space 300 for a designated period. For example, sensing information, which is acquired using at least one of an acceleration sensor and a gyro sensor included in a sensor module (e.g., the sensor module 176 of FIG. 1, which includes a sensor) in the first zone or the second zone during the designated period, indicates the movement of the electronic device 101, the processor 120 may be configured to collect data from a first time at which the movement is detected to a second time at which the movement is not detected. In this regard, the movement of the electronic device 101 may include the travel of the electronic device 101, and data collected from a first time at which the movement is detected to a second time at which the movement is not detected may be understood as path data relating to the continuous travel of the electronic device 101.

According to an embodiment, the processor 120 may be configured to collect path data at a designated time interval with respect to each of the multiple paths 310, 320, and 330 of the electronic device 101. Referring to FIG. 4, taking a first path 410 of the electronic device 101 in an indoor space 400 as an example, the processor 120 may be configured to collect, based on at least a time interval corresponding to a designated sampling rate, data for each of multiple points T1 to T10 on the first path 410 according to the time interval, and aggregate the collected data as first path data.

According to various embodiments, the processor 120 may be configured to preprocess the path data collected with respect to each of the multiple paths 310, 320, and 330 of the electronic device 101. For example, the processor 120 may be configured to perform preprocessing of removing the sample average of the collected path data or reducing the variation of the collected path data by using at least a finite impulse response (FIR) filter. Alternatively, when the electronic device 101 moves multiple times on the same path, the processor 120 may be configured to preprocess the collected path data based on a dynamic time warping or interpolation algorithm in order to compensate for the collection of different amounts of path data according to the moving speed of the electronic device 101 (or a moving speed or a moving stride of a user who has possessed the electronic device 101).

According to various embodiments, the processor 120 may be configured to determine the entry (or existence) of the electronic device 101, as an operation before the collecting of multiple pieces of path data for each of the multiple paths 310, 320, and 330 of the electronic device 101. For example, the processor 120 may be configured to store, in a memory (e.g., the memory 130 of FIG. 1), information (e.g., service set identifier (SSID) or basic SSID (BSSID)) relating to at least one access point disposed in the indoor space 300, and when a wireless LAN signal (e.g., a beacon signal) received later through a wireless communication module (e.g., the wireless communication module 192 of FIG. 1) includes at least part of the information (e.g., SSID or BSSID) having been stored in the memory 130, the processor 120 may be configured to determine that the electronic device 101 has entered (or exists in) the indoor space 300.

For another example, the processor 120 may be configured to store, in the memory 130, information relating to at least one cellular base station (e.g., physical-layer cell ID (PCI), cell global identity (CGI), or absolute radio frequency channel number (ARFCN)) and location information of each cellular base station (e.g., longitude and latitude). When information (e.g., international mobile subscriber identity (IMSI), physical-layer cell ID (PCI), cell global identity (CGI), or absolute radio frequency channel number (ARFCN)), received later from at least one of a cellular base station of a serving cell and a cellular base station of a neighbor cell through the wireless communication module 192, includes at least part of information (e.g., SSID or BSSID) stored in the memory 130, the processor 120 may be configured to determine longitude and latitude information about the electronic device 101 by using the received information. The processor 120 may be configured to determine whether the electronic device 101 enters the indoor space 300 based on the determined longitude and latitude information of the electronic device 101. According to various embodiments, the information (e.g., PCI, CGI, or ARFCN) relating to the at least one cellular base station and the location information (e.g., longitude and latitude) of each cellular base station may be stored in an external server (e.g., the server 108 of FIG. 1). In this case, the processor 120 may be configured to transmit the cellular base station information received by the electronic device 101 to the external server 108, and receive, from the external server 108, the longitude and latitude information of the electronic device 101 determined based on the cellular base station information in the external server 108. The processor 120 may be configured to determine whether the electronic device 101 enters the indoor space 300 based on at least the longitude and latitude information of the electronic device 101 received from the external server 108.

According to various embodiments, as an operation before the collecting path data for each of the multiple paths 310, 320, and 330 of the electronic device 101, the processor 120 may be configured to receive a user input for specifying a zone (e.g., a first zone and a second zone) in which the path data is to be collected within the indoor space 300. In this regard, an application for supporting a location-based service may be stored in the memory 130 of the electronic device 101, and the processor 120 may be configured to provide a graphic user interface of an application by using a display device (e.g., the display device 160 of FIG. 1) during an initial configuration operation of the location-based service. According to an embodiment, the graphic user interface may include a geographic layout with regard to the indoor space 300 configured in the electronic device 101, and the processor 120 may be configured to receive a user input for specifying a zone for collection of path data based on the geographic layout with regard to the indoor space 300. According to various embodiments, the geographic layout may include at least one of a measurement-based geographic map of the indoor space 300, an abstracted geographic map, and a list indicating zone information (e.g., a room, a living room, or a bathroom) of the indoor space 300. Each processor herein includes processing circuitry.

According to an embodiment, in response to receiving a user input through the graphic user interface, the processor 120 may be configured to request movement of the electronic device 101 (e.g., outputs a text or voice-based message) to a zone designated by a user. The processor 120 may be configured to map information relating to a cellular signal or a wireless LAN signal (e.g., a received signal strength indicator (RSSI), SSID, or BSSID), which is received in a zone to which the electronic device 101 moves in response to the request, to the corresponding zone, and store the same in a memory (e.g., the memory 130 of FIG. 1). The processor 120 may be configured to compare information of a cellular signal or a wireless LAN signal (e.g., RSSI), which is received in a predetermined zone within the indoor space, with information mapped to a zone specified by the user, and recognize a zone in which path data relating to movement of the electronic device 101 is to be collected, based on at least the comparison.

Based on the above description, when it is determined that the entry (or existence) of the electronic device 101 into the indoor space 300 configured in the electronic device 101, the entry (or existence) of the electronic device 101 into a specified zone within the corresponding indoor space 300, and the movement of the electronic device 101 in the corresponding zone occur sequentially or simultaneously during a predetermined period related to the collection of multiple pieces of data, the processor 120 may be configured to collect multiple pieces of path data relating to the movement of the electronic device 101. In various embodiments, the processor 120 may be configured to not receive a user input specifying a zone, in which multiple pieces of path data are to be collected, within the indoor space 300. In this case, when it is determined that the entry of the electronic device 101 into the indoor space 300 configured in the electronic device 101 and the movement of the electronic device 101 in the indoor space 300 occur sequentially or simultaneously, the processor 120 may be configured to collect multiple pieces of path data relating to the movement of the electronic device 101.

According to various embodiments, the processor 120 may be configured to further receive, through an application for supporting the location-based service, a user input for specifying at least one of information on a period during which multiple pieces of path data are to be collected, and information on a time interval at which data with regard to the traveling path of the electronic device 101 is to be collected. Alternatively, at least one of the period information and the time interval information may be determined based on at least scheduled information or an own algorithm of the electronic device 101 irrespective of the user input. For example, the period information may be dynamically determined according to a collection amount of multiple pieces of path data required for determining an intersection area relating to the movement of the electronic device 101, and the time interval information may be determined based on at least a sampling rate configured differently according to the type of path data, which will be described later with reference to FIG. 5B.

Figure 5A:
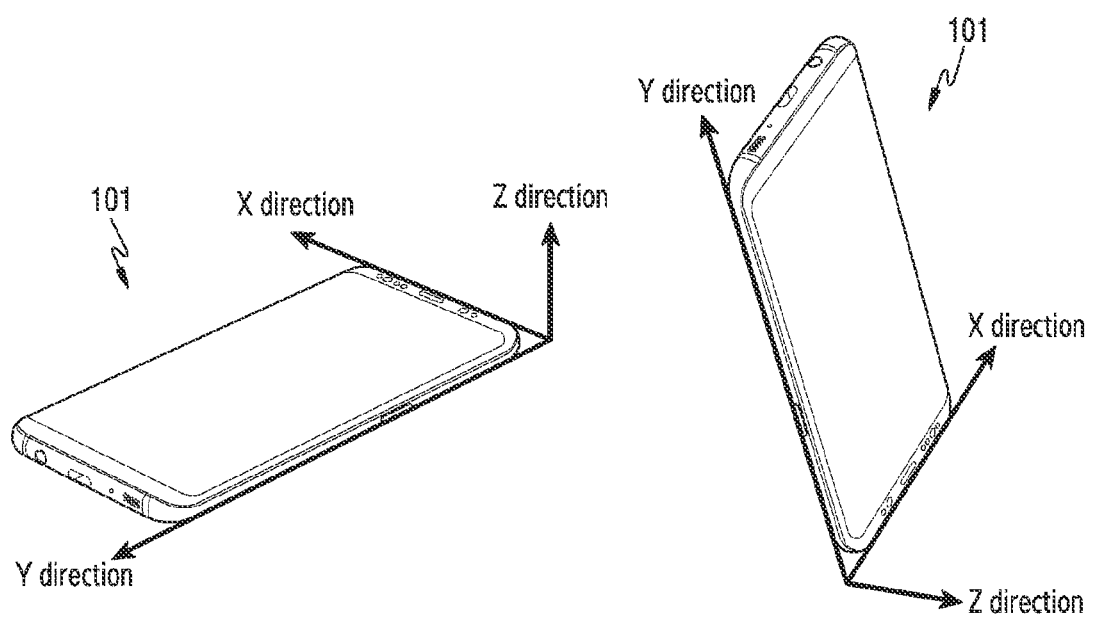
FIG. 5A illustrates an example of a coordinate direction with reference to an electronic device according to an example embodiment.

FIG. 5A illustrates an example of a coordinate direction with reference to an electronic device according to an embodiment, and FIG. 5B illustrates an example of a virtual marker according to an embodiment.

Referring to FIG. 5A, the processor (e.g., the processor 120 of FIG. 1, including processing circuitry) of the electronic device 101 (e.g., the electronic device 101 of FIG. 1) may be configured to process data, which is acquired through a sensor module (e.g., the sensor module 176 of FIG. 1, including a sensor) with respect to a traveling path of the electronic device 101, to correspond to a coordinate direction defined based on the electronic device 101. As an example of acquiring magnetic data through a magnetic sensor, the processor 120 may be configured to process the acquired magnetic data into an X-axis direction magnetic field component of the electronic device 101, a Y-axis direction magnetic field component of the electronic device 101, and a Z-axis direction magnetic field component of the electronic device 101. According to an embodiment, the coordinate direction with reference to the electronic device 101 may be expressed differently from the global coordinate system depending on a state of possessing the electronic device 101 by a user, a state of holding the electronic device 101 by the user, or a state in which the electronic device 101 is mounted on a predetermined substrate.

Hereinafter, a virtual marker 510 described with reference to FIG. 5B may refer to a set of pieces of data (e.g., Nth path data) acquired at a designated time interval (e.g., one second interval) with respect to the Nth path of the electronic device 101, and may be used as reference data for determining the location of the electronic device 101 (or a space in which the electronic device 101 is located).

Referring to FIG. 5B, the virtual marker 510 may include sensing values indicating information on the Nth path of the electronic device 101, and the virtual marker 510 may be stored in a memory (e.g., the memory 130 of FIG. 1). In an embodiment, the virtual marker 510 may include at least one of a magnetic sensing value 520, an acceleration sensing value 530, a gyro sensing value 540, a first wireless communication signal 550, and a second wireless communication signal 560.

In an embodiment, the magnetic sensing value 520 may include a magnitude value for each direction of the magnetic field, which is measured at a specific speed according to a sampling rate designated in the Nth path. The processor 120 of the electronic device 101 may be configured to measure the magnitude value for each direction of the magnetic field during a designated measurement duration in order to measure the magnetic sensing value 520. The measurement duration may be configured as a time for measuring the magnitude value for each direction of the magnetic field during one-time measurement for example. For example, when the sampling rate is 1 Hz and the measurement duration is 0.1 seconds, the processor 120 may be configured to measure the magnitude value for each direction of the magnetic field for 0.1 second at a designated time interval (e.g., a periodicity of 1 second). Accordingly, the measurement of the magnetic field may be performed for 0 second to 0.1 second, 1.0 second to 1.1 seconds, . . . , or N.0 seconds to N.1 seconds (N is a natural number).

In an embodiment, the processor 120 may be configured to measure a magnetic field in the Nth path of the electronic device 101, by using a magnetic field sensor (or a magnetic sensor) included in a sensor module (e.g., the sensor module 176 of FIG. 1). For example, the processor 120 may be configured to measure the magnetic field in the Nth path from a first time (Timestamp 1) to a Nth time (Timestamp N), by using the magnetic field sensor. In this case, the magnetic sensing value 520 may include the strength (MagX1) in the X-axis direction of the magnetic field measured at a first time (Timestamp 1), the strength (MagY1) in the Y-axis direction of the magnetic field measured at a first time (Timestamp 1), and the strength (MagZ1) in the Z-axis direction of the magnetic field measured at a first time (Timestamp 1). Correspondingly, the magnetic sensing value 520 may include the strength (MagXN) in the X-axis direction of the magnetic field measured at a Nth time (Timestamp N), the strength (MagYN) in the Y-axis direction of the magnetic field measured at a Nth time (Timestamp N), and the strength (MagZN) in the Z-axis direction of the magnetic field measured at a Nth time (Timestamp N).

In an embodiment, the acceleration sensing value 530 may include a magnitude value for each direction of the acceleration of the electronic device 101 measured at a specific rate according to a sampling rate designated in the Nth path. The processor 120 of the electronic device 101 may be configured to measure a magnitude value for each direction of acceleration during a designated measurement duration in order to measure the acceleration sensing value 530. The measurement duration may be configured, for example, as a time (e.g., 0.1 second) for measuring the magnitude value for each direction of acceleration during one-time measurement.

In an embodiment, the processor 120 may be configured to measure acceleration in the Nth path of the electronic device 101, by using an acceleration sensor included in the sensor module 176 (including a sensor). For example, the processor 120 may be configured to measure the acceleration on the Nth path from a first time (Timestamp 1) to a Nth time (Timestamp N) by using the acceleration sensor. In this case, the acceleration sensing value 530 may include the acceleration (AccX1) in the X-axis direction of the electronic device 101 measured at a first time (Timestamp 1), the acceleration (AccY1) in the Y-axis direction of the electronic device 101 measured at a first time (Timestamp 1), and the acceleration (AccZ1) in the Z-axis direction of the electronic device 101 measured at a first time (Timestamp 1). Correspondingly, the acceleration sensing value 530 may include the acceleration (AccXN) in the X-axis direction of the electronic device 101 measured at a Nth time (Timestamp N), the acceleration (AccYN) in the Y-axis direction of the electronic device 101 measured at a Nth time (Timestamp N), and the acceleration (AccZN) in the Z-axis direction of the electronic device 101 measured at a Nth time (Timestamp N).

In an embodiment, the gyro sensing value 540 may include the value of angular orientation formed by the electronic device 101 with the ground, measured at a specific rate according to a sampling rate designated in the Nth path. The processor 120 of the electronic device 101 may be configured to measure an angular direction value for a designated measurement duration in order to measure the gyro sensing value 540. The measurement duration may be configured, for example, to a time (e.g., 0.1 second) for measuring a magnitude value for each direction of an angle during one-time measurement.

In an embodiment, the processor 120 may be configured to measure the value of angular direction formed by the electronic device 101 with the ground in the Nth path of the electronic device 101, by using a gyro sensor included in the sensor module 176. For example, the processor 120 may be configured to measure the value of angular direction, formed by the electronic device 101 with the ground in the Nth path from a first time (Timestamp 1) to a Nth time (Timestamp N), by using the gyro sensor. In this case, the gyro sensing value 540 may include a roll value (Roll1) of the electronic device 101 measured at a first time (Timestamp 1), a pitch value of (Pitch1) of the electronic device 101 measured at a first time (Timestamp 1), and a yaw value (Yaw1) of the electronic device 101 measured at a first time (Timestamp 1). Correspondingly, the gyro sensing value 540 may include the roll value (RollN) of the electronic device 101 measured at a Nth time (Timestamp N), the pitch value (PitchN) of the electronic device 101 measured at a Nth time (Timestamp N), and the yaw value (YawN) of the electronic device 101 measured at a Nth time (Timestamp N).

In an embodiment, the gyro sensing value 540 may include a magnitude value for each direction of the angular acceleration of the electronic device 101, which is measured at a specific speed according to a designated sampling rate in the Nth path. The processor 120 of the electronic device 101 may measure a magnitude value for each direction of angular acceleration for a designated measurement duration in order to measure the gyro sensing value 540.

In an embodiment, the processor 120 may be configured to measure the angular acceleration of the electronic device 101 on the Nth path from a first time (Timestamp 1) to a Nth time (Timestamp N), by using the gyro sensor included in the sensor module 176. In this case, the gyro sensing value 540 may include an angular acceleration (AnvX1) in the X-axis direction of the electronic device 101 measured at a first time (Timestamp 1), an angular acceleration (AnvY1) in the Y-axis direction of the electronic device 101 measured at a first time (Timestamp 1), and an angular acceleration (AnvZ1) in the Z-axis direction of the electronic device 101 measured at a first time (Timestamp 1). Correspondingly, the gyro sensing value 540 may include an angular acceleration (AnvXN) in the X-axis direction of the electronic device 101 measured at a Nth time (Timestamp N), an angular acceleration (AnvYN) in the Y-axis direction of the electronic device 101 measured at a Nth time (Timestamp N), and an angular acceleration (AnvZn) in the Z-axis direction of the electronic device 101 measured at a Nth time (Timestamp N).

In an embodiment, the first wireless communication signal 550 may include a strength value of an access point (AP) signal measured using a wireless communication module (e.g., the wireless communication module 192 of FIG. 1). The first wireless communication signal 550 may include information relating to the number of AP signals of a broadband LAN (WLAN). The first wireless communication signal 550 may include information relating to the strength of the AP signal measured on the Nth path. For example, the first wireless communication signal 550 may include values from the strength of the first AP signal (AP1 signal strength) to the strength of the Nth AP signal (APN signal strength).

In an embodiment, the second wireless communication signal 560 may include a strength value of a cell signal of cellular communication, measured using the wireless communication module 192. The second wireless communication signal 560 may include information relating to the number of cells. The second wireless communication signal 560 may include information relating to the strengths of the first to Nth cell signals measured on the Nth path. For example, the second wireless communication signal 560 may include values from the strength of the first cell signal (Cell1 signal strength) to the strength of the Nth cell signal (cellN signal strength).

In an embodiment, the processor 120 may use a camera (e.g., the camera 180 of FIG. 1) supporting the augmented reality (AR) technology in order to spatially match the sensing values (or signal values) measured on the Nth path to the Nth path, and may be configured to estimate the relative location of the electronic device 101 by processing an image acquired based on the camera 180.

In an embodiment, the processor 120 may be configured to generate a virtual marker including information of a one-dimensional line shape, a virtual marker including information of a two-dimensional planar shape, or a virtual marker including information of a three-dimensional space shape, by using at least one of the sensing values 520, 530, and/or 540 and the signal values 550 and/or 560.

In an embodiment, the virtual marker 510 may include movement information of the electronic device 101 including at least one of sensing values changed while the electronic device 101 is moving, a speed of the electronic device 101, and a direction of the electronic device 101. In an embodiment, the virtual marker 510 may include features of a designated space. When the electronic device 101 generates the virtual marker 510 in an indoor space, the virtual marker 510 may include at least one of a feature relating to a structural shape of the indoor space and a physical characteristic of an object disposed in the indoor space. For example, the shape of a structure including at least one of a steel frame, a staircase, and a wall relating to the indoor space may be reflected in the virtual marker 510. As another example, material characteristics of an object such as furniture arranged in an indoor space may be reflected in the virtual marker 510.

In an embodiment, the virtual marker 510 may include magnetic field information reflecting the structural information of the indoor space. The virtual marker 510 may include at least one of an acceleration value and rotational movement information of the electronic device 101. The virtual marker 510 may include information on surrounding wireless signals in relation to optimization of power consumption of the electronic device 101. For example, the virtual marker 510 may include at least one of Wi-Fi signal information and cellular signal information. In the virtual marker 510, a first time (Timestamp 1) to a Nth time (Timestamp N) may be stored as values corresponding to time intervals configured to measure a sensing value (at least one of the sensing values 520, 530, and 540).

Although not shown, according to various embodiments, the virtual marker 510 may include a latitude value and a longitude value of the electronic device 101. The latitude value and longitude value of the electronic device 101 with regard to the Nth path may be measured from a first time (Timestamp 1) to a Nth time (Timestamp N), by using at least one of a global positioning system (GPS) and a wireless communication module 192 included in the sensor module 176. For example, the latitude value measured on the Nth path may include the first latitude value (Lat1) measured at a first time (Timestamp 1) to the Nth latitude value (LatN) measured at a Nth time (Timestamp N). The longitude value measured on the Nth path may include the first longitude value (Lon1) measured at a first time (Timestamp 1) to the Nth longitude value (LonN) measured at a Nth time (Timestamp N).

Figure 6:
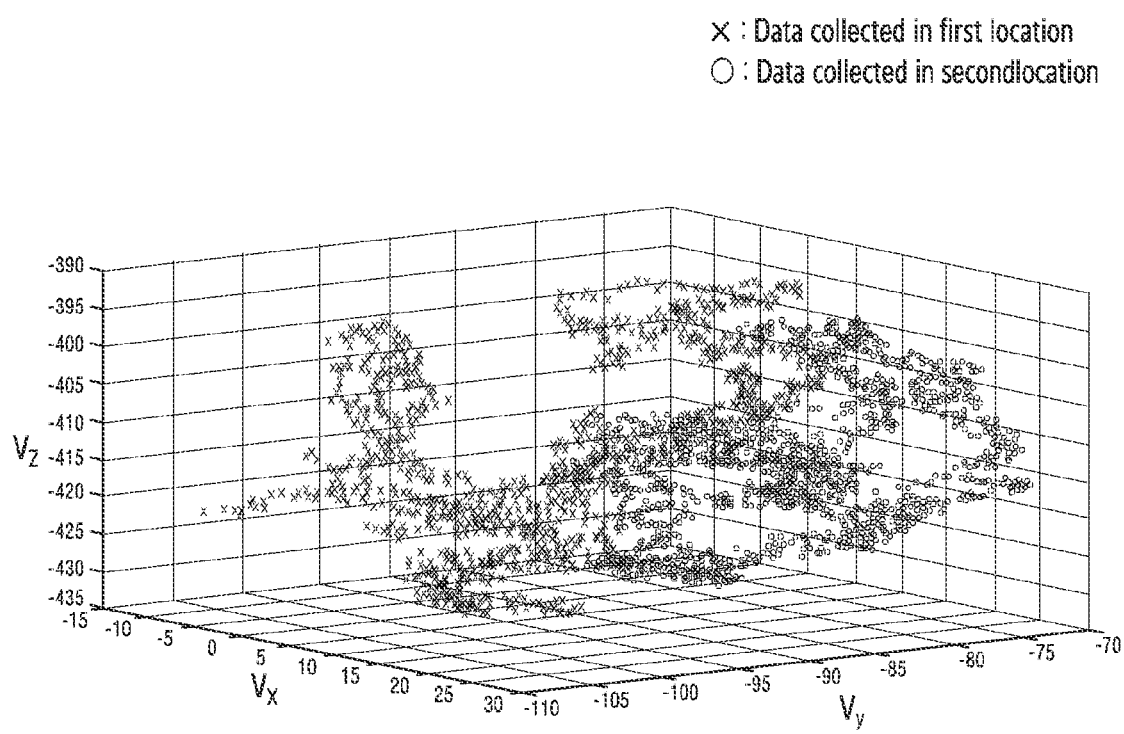
FIG. 6 illustrates the distribution form of pieces of data collected in a first zone and a second zone in an indoor space according to an example embodiment.
Figure 7:
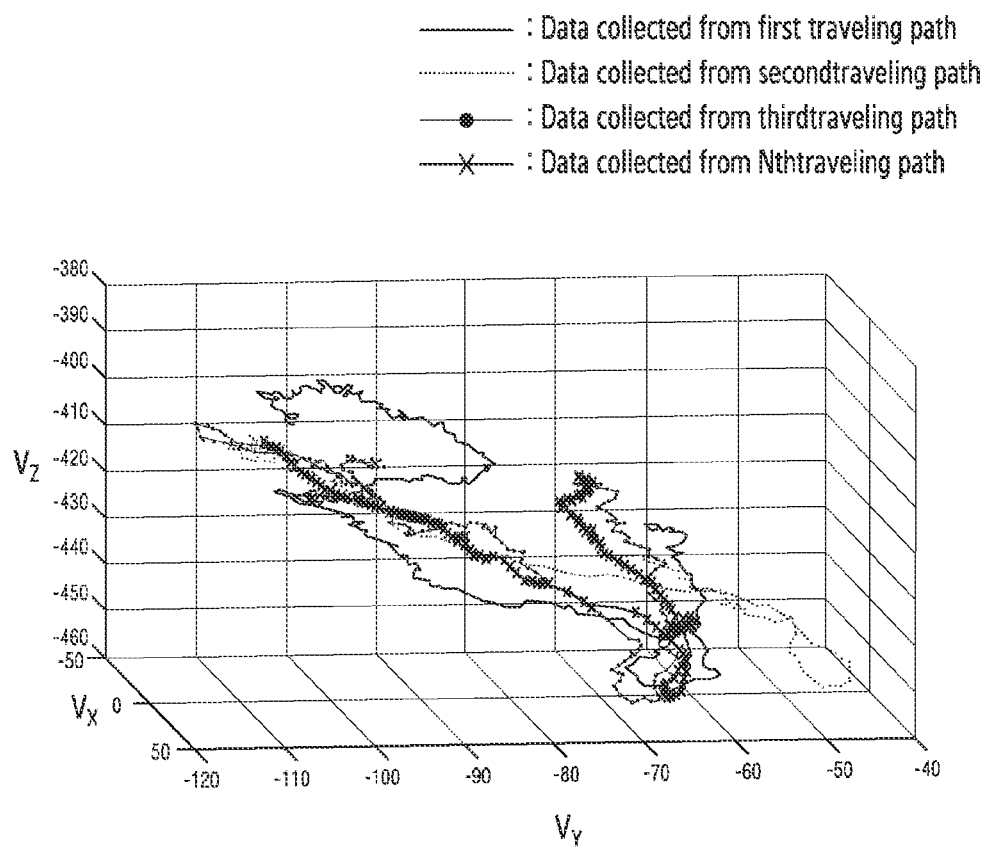
FIG. 7 illustrates the distribution form of pieces of data collected from each of various traveling paths of an electronic device according to an example embodiment.

FIG. 6 illustrates the distribution form of pieces of data collected in a first zone and a second zone in an indoor space according to an embodiment, and FIG. 7 illustrates the distribution form of pieces of data collected from each of various traveling paths of the electronic device according to an embodiment. Each of VX, VY, and VZ shown in FIGS. 6 and 7 may indicate a data value for a coordinate direction (e.g., the coordinate direction of FIG. 5A) with reference to the electronic device (e.g., the electronic device 101 of FIG. 1). For example, when magnetic data is collected as collection data, each of Mag X, Mag Y, and Mag Z may correspond to VX, VY, and VZ.

FIG. 6 is a 3D graph showing pieces of magnetic data collected in each of a first zone and a second zone within an indoor space (e.g., the indoor space 200, 300 or 400 of FIG. 2, FIG. 3, or FIG. 4, respectively). Referring to FIG. 6, it may be seen that magnetic data (e.g., X) collected in the first zone and magnetic data (e.g., O) collected in the second zone indicate mutually distinct distribution characteristics on the graph. For example, magnetic data collected in a predetermined zone within the indoor space 200 or 300 may have distorted direction values (Mag X, Mag Y, and Mag Z) due to the magnetic characteristics of a steel frame or a steel structure disposed in or adjacent to the corresponding zone. Based on this, pieces of magnetic data collected in each of the first zone and the second zone in the indoor space 200 or 300 may have mutually distinct direction values according to the degree of distortion by the steel frame or steel structure relating to a zone in which the corresponding magnetic data is collected.

FIG. 7 illustrates a 3D graph showing pieces of magnetic data collected from each of multiple paths of an electronic device (e.g., the electronic device 101 of FIG. 1) moving between a first zone and a second zone. Referring to FIG. 7, it may be seen that pieces of magnetic data collected from a first path, pieces of magnetic data collected from a second path, pieces of magnetic data collected from a third path, and pieces of magnetic data collected on the Nth path may indicate an abrupt change in distribution in a third area between a first area on the graph corresponding to the first zone and a second area on the graph corresponding to the second zone. This may be understood as meaning that, according to the movement of the electronic device 101 from the first zone to the second zone or the movement of the electronic device 101 from the second zone to the first zone, pieces of magnetic data collected from a path with regard to the movement undergo abrupt changes. Based on this, with respect to multiple pieces of magnetic data collected from a predetermined path of the electronic device 101, the pieces of magnetic data collected in the first zone and the pieces of magnetic data collected in the second zone may indicate mutually distinct direction values.

In FIGS. 6 and 7 above, magnetic data is referred to in order to show distinct characteristics between pieces of data collected in each of the first zone and the second zone. However, the aforementioned acceleration data, gyro data, wireless LAN signal, or cellular signal may also indicate a value or strength distinguished for each zone by the structure of a zone in which data collection is performed, an object within a zone for data collection, or a wireless footprint characteristic in a zone for data collection.

Figure 8:
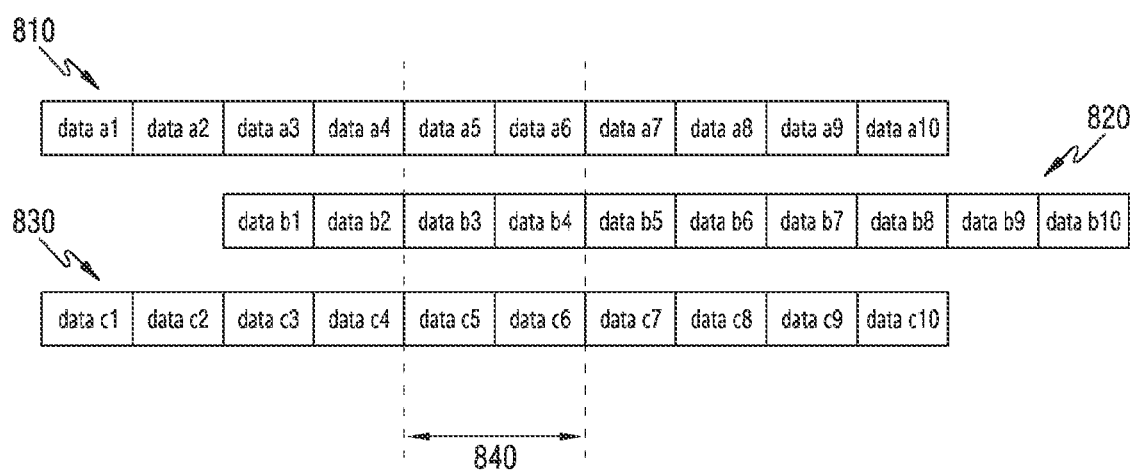
FIG. 8 illustrates a similarity relation between pieces of data collected from each of various traveling paths of an electronic device according to an example embodiment.
Figure 9:
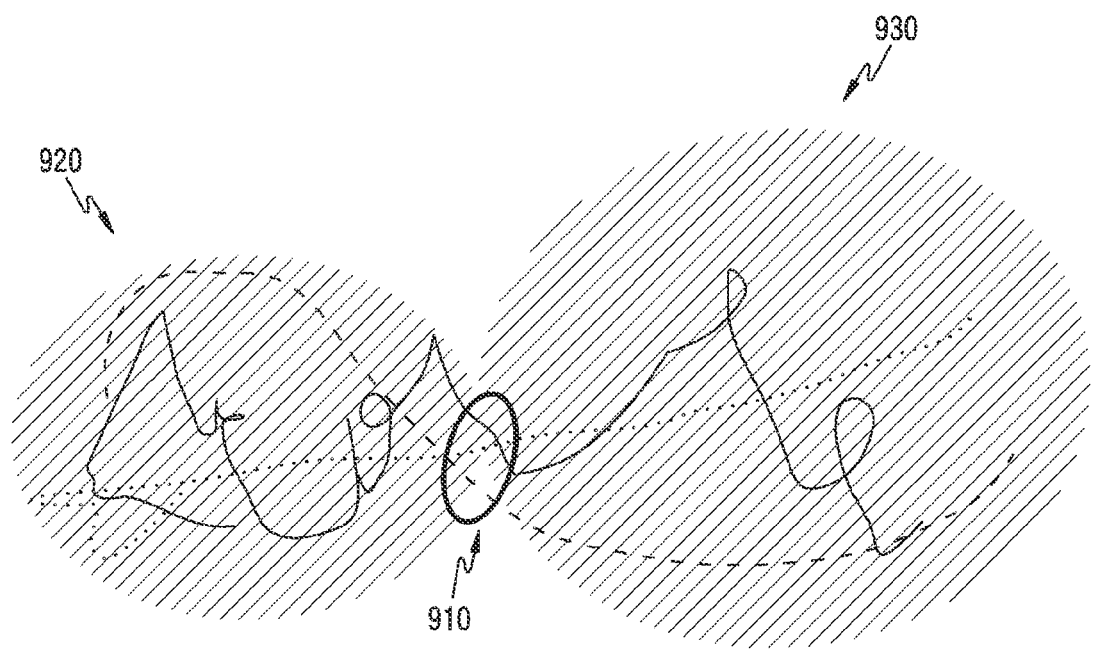
FIG. 9 illustrates the form of spatial division of various traveling paths of an electronic device according to an example embodiment.

FIG. 8 illustrates a similarity relation between pieces of data collected from each of various traveling paths of an electronic device according to an embodiment, and FIG. 9 illustrates a spatial division form of various traveling paths of an electronic device according to an embodiment.

Referring to FIGS. 8 and 9, the processor (e.g., the processor 120 of FIG. 1) of the electronic device (e.g., the electronic device 101 of FIG. 1) according to an embodiment may be configured to determine an intersection area for multiple traveling paths of the electronic device 101 moving between a first zone and a second zone. For example, the processor 120 may be configured to determine an intersection area in an indoor space where a first path, a second path, and a third path at least partially overlap each other, based on the degree of similarity among pieces of data configuring first path data 810 collected from the first path of the electronic device 101, pieces of data configuring second path data 820 collected from the second path thereof, and pieces of data configuring third path data 830 collected from the third path thereof (e.g., when comparing pieces of data corresponding to the first path, pieces of data corresponding to the second path, and pieces of data corresponding to the third path, the similarity therebetween has a value similar to a designated threshold ratio or more). According to various embodiments, the multiple paths of the electronic device 101 are not limited to the first path, the second path, and the third path, and may be implemented with various number of paths in relation to the number of times of movement of the electronic device 101 or the amount of data collection required to determine the intersection area during a designated period related to the collection of the multiple pieces of path data.

In an embodiment, when the designated period elapses (or when the collection of a designated amount of path data for determining an intersection area is completed), the processor 120 may be configured to determine the degree of similarity between the multiple pieces of collected path data. For example, the processor 120 may be configured to compare direction values or strength values of multiple pieces of data configuring each of the first path data 810, the second path data 820, and the third path data 830 (e.g., data a1 to data a10 collected from the first path, data b1 to b10 collected from the second path, and data c1 to c10 collected from the third path). The processor 120 may be configured to identify, based on at least the comparison, multiple pieces of first data 840 which are similar to each other at a designated level or higher (e.g., a designated threshold ratio or more) (e.g., data a5 and data a6 collected from the first path, data b3 and data b4 collected from the second path, and data c5 and data c6 collected from the third path), and determine one area in an indoor space, in which the multiple pieces of first data 840 are collected, as an intersection area 910 in which multiple paths (e.g., the first path, the second path, and the third path) of the electronic device 101 at least partially overlap each other.

According to an embodiment, the processor 120 may be configured to spatially partition at least part of the first path data 810, the second path data 820, and the third path data 830, based on the intersection area 910 determined with respect to the multiple paths of the electronic device 101. In this regard, the processor 120 may be configured to spatially arrange multiple pieces of data for each of the first path data 810, the second path data 820, and the third path data 830 on an indoor space. The processor 120 may be configured to group multiple pieces of second data having mutually identical or similar first distribution characteristics (e.g., directionality or adjacency of spatially arranged pieces of data) (e.g., data a1 to data a4 collected from the first path, data b1 and data b2 collected from the second path, and data c1 to data c4 collected from the third path) into a first group, based on the determined intersection area 910. Similarly, the processor 120 may be configured to group multiple pieces of third data having mutually identical or similar second distribution characteristics different from the first distribution characteristics (e.g., data a7 to data a10 collected from the first path, data b5 to data b10 collected from the second path, and data c7 to data c10 collected from the third path) into a second group, based on the determined intersection area 910.

In an embodiment, the processor 120 may be configured to determine an area range in which multiple pieces of second data in the first group are collected as a first space 920 in an indoor space, and determine an area range in which multiple pieces of third data in the second group are collected as a second space 930 in the indoor space. According to various embodiments, the size of each of the first space 920 and the second space 930 may be determined by a one-dimensional boundary capable of covering an area range in which multiple pieces of second data are collected or an area range in which multiple pieces of third data are collected. According to various embodiments, in response to the determination of the first space 920 and the second space 930, the processor 120 may be configured to visually display the first space 920 and the second space 930 on a graphic user interface of an application including a geographic layout for the indoor space. When the processor 120 may be configured to output a graphic user interface to which the first space 920 and the second space 930 are reflected, and when a user input relating to user confirmation is received through the graphic user interface, the processor 120 may be configured to confirm the determination of the first space 920 and the second space 930.

In an embodiment, the processor 120 may be configured to define an index for each of the determined first space 920 and the second space 930. For example, with regard to each of points on the first path, points on the second path, and points on the third path, from which the multiple pieces of second data are collected, the processor 120 may be configured to generate a virtual marker based on at least part of the multiple pieces of second data (e.g., a virtual marker corresponding to points on the first path, a virtual marker corresponding to points on the second path, and a virtual marker corresponding to points on the third path), and generate a first index for the first space 920 including the generated multiple virtual markers. For another example, the processor 120 may be configured to generate an integrated virtual marker (e.g., an integrated virtual marker including a representative value (average value) of multiple pieces of second data collected from points on the first path, points on the second path, and points on the third path), and generate a first index for the first space 920 by using the integrated virtual marker. Similarly, with regard to each of points on the first path, points on the second path, and points on the third path, from which the multiple pieces of third data are collected, processor 120 may be configured to generate a virtual marker based on the multiple pieces of third data (e.g., a virtual marker corresponding to points on the first path, a virtual marker corresponding to points on the second path, and a virtual marker corresponding to points on the third path), and generate the second index for the second space 930 including the generated multiple virtual markers. Alternatively, the processor 120 may be configured to generate the second index for the second space 930 by using an integrated virtual marker including a representative value (e.g., average value) of the multiple pieces of third data.

In various embodiments, after determining the first space 920 and the second space 930 (or after index generation), the processor 120 may be configured to request configuration of an event to be provided when the electronic device 101 enters the first space 920 or the second space 930 (or stays for more than a designated period of time therein) through an application for providing a location-based service. For example, the processor 120 may be configured to display a list of at least one event that may be provided to the first space 920 or the second space 930, through the execution screen of the application, and receive a user input to select a specific event. The processor 120 may be configured to determine an event corresponding to the user input as a location-based service for the first space 920 or the second space 930, and include information related to the event in the index of the first space 920 or the second space 930. Alternatively, the processor 120 may be configured to receive a user input for designating, as the event, output of voice data according to a user's utterance, output of image data or recorded data according to a user's image capturing, or output of text data according to a user's handwriting, and include information regarding the corresponding event in the index of the first space 920 or the second space 930. In various embodiments, the event may be provided based on the execution of at least one application preloaded or installed in the electronic device 101 or may be provided based on the output of data generated by the user.

In an embodiment, the processor 120 may be configured to store indexes for each of the first space 920 and the second space 930 in a memory (e.g., the memory 130 of FIG. 1), and determine the location of the electronic device 101 (or a space in which the electronic device 101 is located) by making reference to the indexes. In this regard, after the determination of the first space 920 and the second space 930 (or after index generation), the processor 120 may be configured to compare data or signal, which is acquired using at least one of the sensor module (e.g., the sensor module 176 of FIG. 1) and the wireless communication module (e.g., the wireless communication module 192 of FIG. 1), with the virtual marker or the integrated virtual marker included in the index. When the acquired data or signal is similar to at least one of multiple virtual markers in the index corresponding to the first space 920 or to the integrated virtual marker at a predetermined level or higher, the processor 120 may be configured to determine that the electronic device 101 is located within the first space 920. Alternatively, when the acquired data or signal is similar to at least one of multiple virtual markers in the index corresponding to the second space 930 or to the integrated virtual marker at a predetermined level or higher, the processor 120 may be configured to determine that the electronic device 101 is located within the second space 930. In an embodiment, when it is determined that the electronic device 101 is located (or entered, or stayed for a designated period of time or longer) in the first space 920 or the second space 930, the processor 120 may be configured to identify event information included in the index corresponding to the first space 920 or the second space 930, and provide a location-based service based on the execution of an application or data output related to the corresponding event information.

Figure 10:
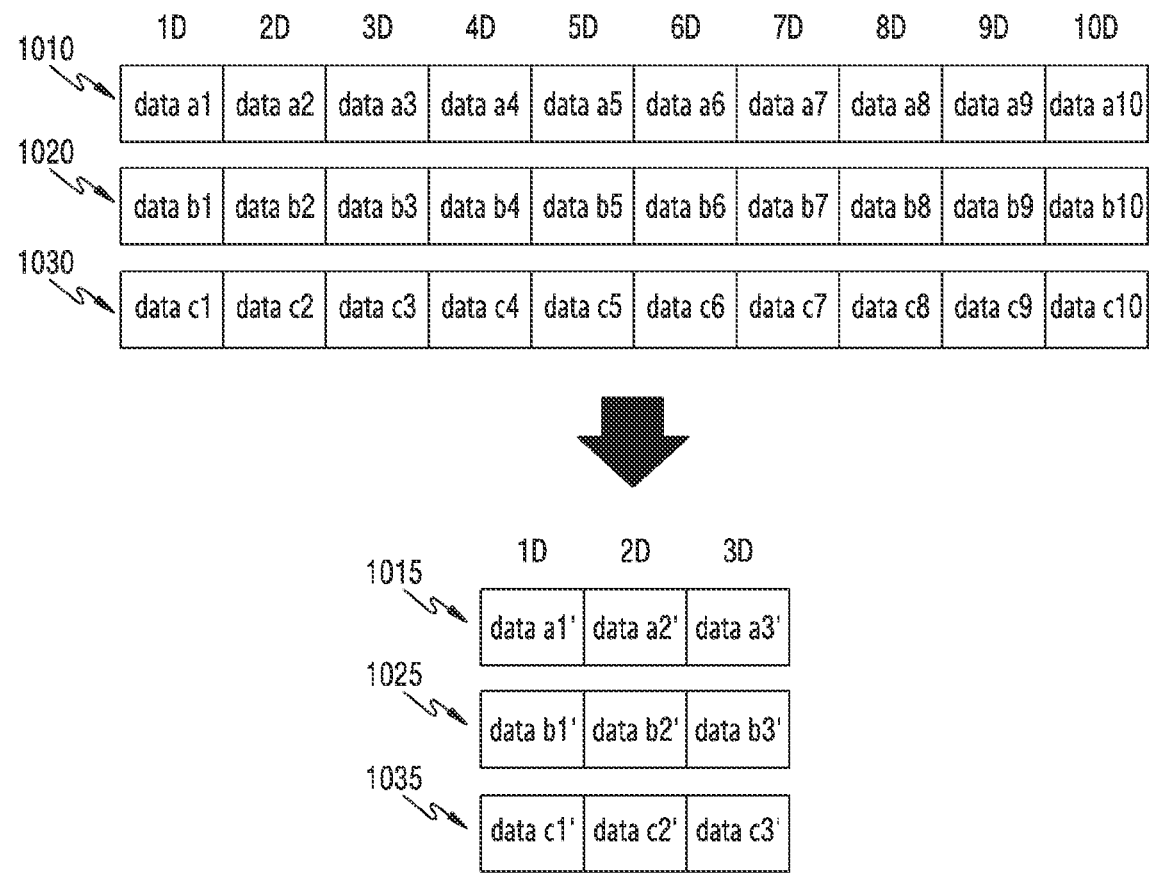
FIG. 10 illustrates the form of filtering pieces of data collected from each of various traveling paths of an electronic device according to an example embodiment.
Figure 11:
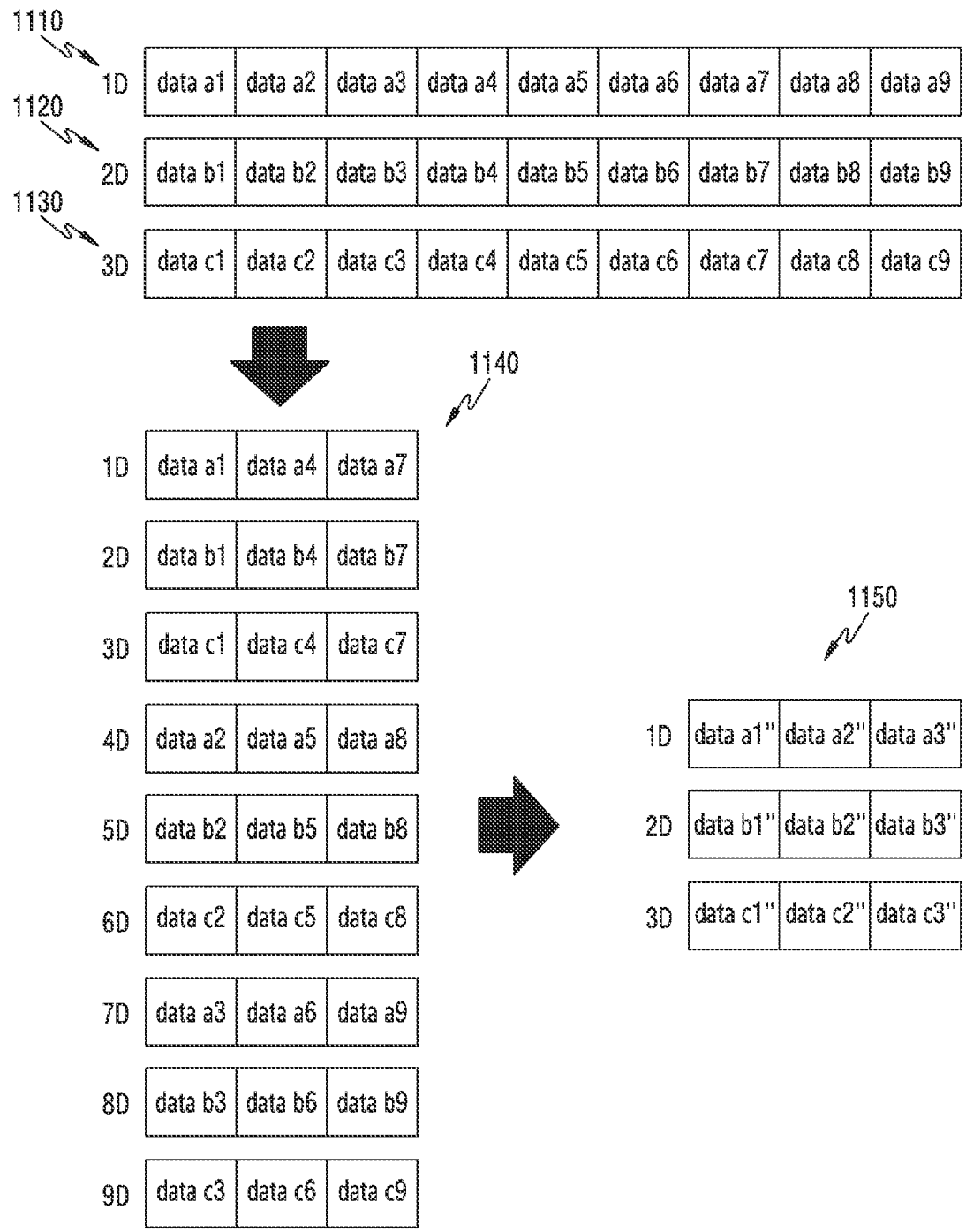
FIG. 11 illustrates the form of filtering pieces of data collected from each of various traveling paths of an electronic device according to another example embodiment.
Figure 12:
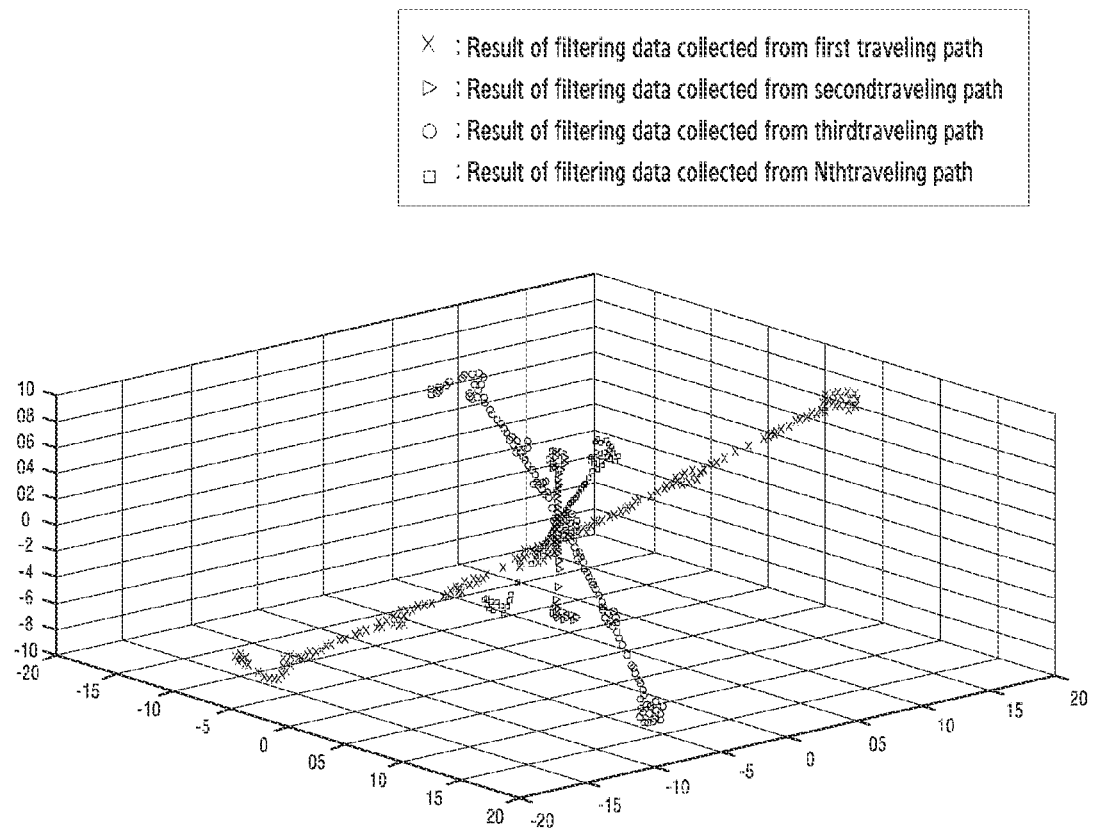
FIG. 12 illustrates the distribution form of filtered pieces of data according to an example embodiment.

FIG. 10 illustrates the form of filtering pieces of data collected from each of various traveling paths of an electronic device according to an embodiment, and FIG. 11 illustrates the form of filtering pieces of data collected from each of various traveling paths of an electronic device according to another embodiment, and FIG. 12 illustrates the distribution form of filtered pieces of data according to an embodiment.

According to an embodiment, the processor (e.g., the processor 120 of FIG. 1) of the electronic device (e.g., the electronic device 101 of FIG. 1) may be configured to filter at least part of multiple pieces of path data collected with regard to each of the multiple paths of the electronic device 101. For example, in an operation of determining an intersection area for the multiple paths by using the collected multiple pieces of path data, the processor 120 may be configured to filter at least part of the multiple pieces of path data in order to reduce an operation quantity or complexity of the multiple pieces of path data. In this regard, the processor 120 may be configured to interpret the path data collected from each of the multiple paths as one vector according to the N dimension, and derive path data that may be interpreted as a relatively low M-dimensional vector than the N dimension by applying a dimensionality reduction technique to the N-dimensional vector-based path data.

For example, with reference to FIG. 10, the processor 120 may be configured to interpret magnetic data-based first path data 1010 (e.g., data a1 to data a10) collected from a first path as a 10-dimensional vector (e.g., may be configured to apply data a1 to data a10 to the 1st axis to the 10th axis, respectively), and apply X-axis direction values (e.g., Mag X1 to Mag X10) of the multiple pieces of magnetic data configuring the first path data 1010 to the 10-dimensional vector. The processor 120 may be configured to perform, with regard to the 10-dimensional vector-based first path data to which the X-axis direction value is applied, a dimensional reduction based on a principal component analysis technique or a t-distributed stochastic neighbor embedding technique, so as to acquire 3D vector-based path data 1015 (e.g., data a1', data a2', and data a3') maintaining the X-axis direction characteristic of the magnetic data. According to an embodiment, the processor 120 may be configured to interpret second path data 1020 (e.g., data b1 to data b10) collected from a second path as a 10-dimensional vector and then perform a dimensional reduction thereof, so as to acquire three-dimensional vector-based path data 1025 (e.g., data b1', data b2', and data b3') maintaining the Y-axis direction characteristic of magnetic data collected from the second path. In addition, the processor 120 may be configured to interpret third path data 1030 (e.g., data c1 to data c10) collected from a third path as a 10-dimensional vector and then perform a dimensional reduction thereof, so as to acquire three-dimensional vector-based path data 1035 (e.g., data c1', data c2', and data c3') maintaining the Z-axis direction characteristic of magnetic data collected from the third path. The processor 120 may be configured to determine an intersection area for multiple paths of the electronic device 101 based on the filtered (e.g., dimensional reduced) multiple pieces of path data (e.g., data a1' to data a3' 1015 collected from the first path, data b1' to data b3' 1025 collected from the second path, and data c1' to data c3' 1035 collected from the third path), and spatially partition the filtered multiple pieces of path data based on the intersection area.

Referring to FIG. 11, the processor 120 may be configured to apply, with regard to magnetic data-based first path data (e.g., data a1 to data a9) collected from a first path, X-axis direction values (e.g., Mag X1 to Mag X9) of multiple pieces of magnetic data configuring the first path data. In addition, the processor 120 may be configured to apply, with regard to second path data (e.g., data b1 to data b9) collected from a second path, Y-axis direction values (e.g., Mag Y1 to Mag Y9) of multiple pieces of magnetic data configuring the second path data; and apply, with regard to third path data (e.g., data c1 to data c9) collected from a third path, Z-axis direction values (e.g., Mag Z1 to Mag Z9) of multiple pieces of magnetic data configuring the third path data. The processor 120 may be configured to interpret, as one three-dimensional data, a combination of data a1 of first path data 1110 to which the X-axis direction value is applied, data b1 of second path data 1120 to which the Y-axis direction value is applied, and data c1 of third path data 1130 to which the Z-axis direction value is applied, and in this case, it may be interpreted that a total of nine 3-dimensional data has been collected. The processor 120 may be configured to interpret, as one 9-dimensional data (e.g., a combination of data a1, data b1, data c1, data a2, data b2, data c2, data a3, data b3, and data c3) by merging three pieces of 3-dimensional data (e.g., a combination of data a1, data b1, and data c1, a combination of data a2, data b2, and data c2, and a combination of data a3, data b3, and data c3), and in this case, it may be interpreted that a total of three 9-dimensional data 1140 has been collected. The processor 120 may be configured to perform, with regard to the one 9-dimensional data, a dimensional reduction based on a principal component analysis technique or a t-distributed stochastic neighbor embedding technique, so as to acquire 3D vector-based path data maintaining the X-axis direction characteristic, Y-axis direction characteristic, and Z-axis direction characteristic of magnetic data (e.g., data a1", data b1", and data c1") and based on this, the processor may acquire a total of three 3-dimensional data 1150 as path data.

FIG. 12 may show a distribution pattern of a small amount of filtered path data obtained by filtering the collected multiple pieces of path data, having been described above with reference to FIG. 7, based on the dimension reduction technique. Referring to FIG. 12, when the filtered path data is analyzed by the processor 120, an intersection zone of the filtered path data and an intersection area for multiple paths of the electronic device 101 corresponding to the intersection zone may be clearly determined compared to that shown in FIG. 7.

Figure 13:
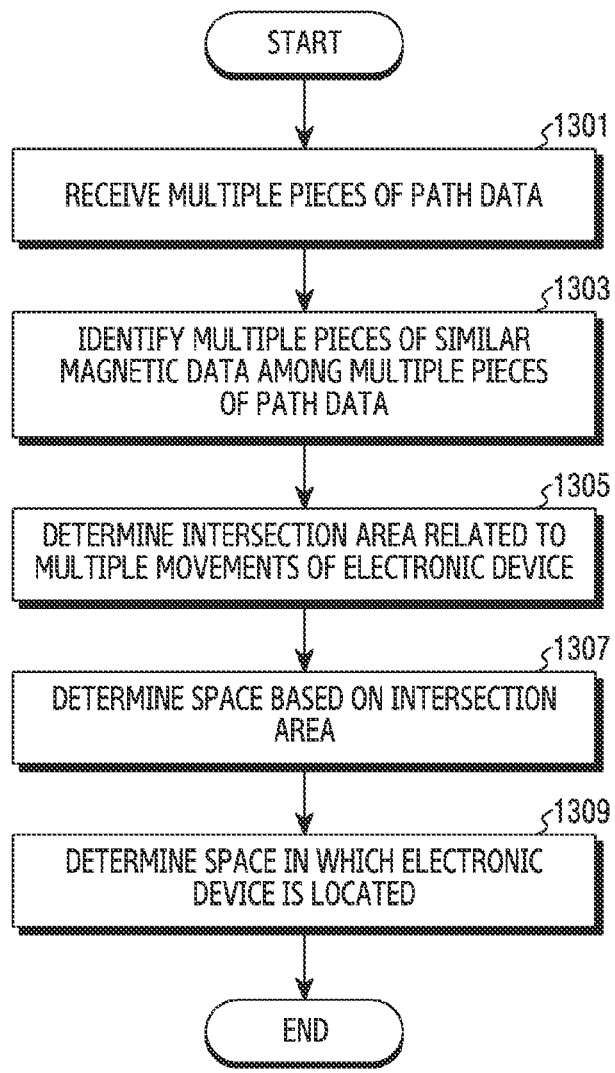
FIG. 13 illustrates a positioning method by an electronic device according to an example embodiment.

FIG. 13 illustrates a positioning method by an electronic device according to an embodiment.

Referring to FIG. 13, in operation 1301, a processor (e.g., the processor 120 of FIG. 1) of an electronic device (e.g., the electronic device 101 of FIG. 1) according to an embodiment may be configured to collect multiple pieces of path data related to movement of the electronic device 101. For example, the processor 120 may be configured to collect pieces of data for each of multiple paths of the electronic device 101 moving between a first zone and a second zone within a designated indoor space. According to an embodiment, pieces of magnetic data, which are acquired at a designated time interval on the first path according to the movement of the electronic device 101, may be collected as first path data, and pieces of magnetic data, which are acquired at the designated time interval on the second path, may be collected as second path data.

According to an embodiment, in operation 1303, the processor 120 may be configured to compare the first path data and the second path data collected for each of multiple paths (e.g., the first path and the second path) of the electronic device 101, so as to identify multiple pieces of first magnetic data having a similarity therebetween. For example, the processor 120 may be configured to identify multiple pieces of first magnetic data having a similarity greater than or equal to a designated level (e.g., similar to each other by a designated threshold ratio or more) between pieces of magnetic data configuring the first path data and pieces of magnetic data configuring the second path data. Each embodiment herein may be used in combination with any other embodiment(s).

According to an embodiment, in operation 1305, the processor 120 may be configured to determine an intersection area of multiple paths (e.g., a first path and a second path) according to multiple movements of the electronic device 101. For example, the processor 120 may be configured to determine an area in an indoor space, in which the multiple pieces of first magnetic data are collected, as an intersection area where the first path and the second path of the electronic device 101 intersect.

According to an embodiment, in operation 1307, the processor 120 may be configured to determine (or define) spaces in the indoor space based on the determined intersection area. In this regard, the processor 120 may be configured to spatially arrange collected multiple pieces of data (e.g., pieces of magnetic data configuring the first path data and pieces of magnetic data configuring the second path data) on the indoor space. The processor 120 may be configured to group multiple pieces of second magnetic data having mutually identical or similar first distribution characteristics (e.g., directionality or adjacency of spatially arranged pieces of data) into a first group based on the determined intersection area, and group multiple pieces of third magnetic data having a second distribution characteristic different from the first characteristic into a second group. The processor 120 may be configured to determine an area range, in which multiple pieces of second magnetic data included in the first group are collected, as a first space in an indoor space, and determine an area range, in which multiple pieces of third magnetic data included in the second group are collected, as a second space in an indoor space. In an embodiment, the processor 120 may be configured to, with regard to each of points on the first path and points on the second path from which the multiple pieces of second data are collected, generate a virtual marker based on at least part of the multiple pieces of second data (e.g., a virtual marker corresponding to points on the first path and a virtual marker corresponding to points on the second path), and generate a first index for the first space including the generated multiple virtual markers. In an embodiment, the processor 120 may be configured to, with regard to each of points on the first path and points on the second path from which the multiple pieces of third data are collected, generate a virtual marker based on at least part of the multiple pieces of third data (e.g., a virtual marker corresponding to points on the first path and a virtual marker corresponding to points on the second path), and generate a second index for a second space including the generated multiple virtual markers.

According to an embodiment, in operation 1309, the processor 120 may be configured to determine a space in which the electronic device 101 is located, based on the determined first space and the second space. For example, after determining the first space and the second space (or, after generation of the first index and second index), the processor 120 may be configured to compare magnetic data acquired using a sensor module (e.g., the sensor module 176 of FIG. 1) with multiple virtual markers included in the first index and multiple virtual markers included in the second index. The processor 120 may be configured to determine that the electronic device 101 is located in the first space when the magnetic data acquired using the sensor module 176 is similar to at least one of the multiple virtual markers in the first index at a designated level or higher and, when the acquired data is similar to at least one of the multiple virtual markers in the second index at a designated level or higher, the processor 120 may be configured to determine that the electronic device 101 is located in the second space. In response to the determining the location of the electronic device 101, the processor 120 may be configured to provide an event defined in a space (e.g., the first space or the second space) in which the electronic device 101 is located.

An electronic device according to various embodiments described above may include a magnetic sensor and a processor operatively connected to the magnetic sensor.

According to various embodiments, the processor may be configured to collect multiple pieces of path data based on first magnetic data related to multiple movements of the electronic device, by using the magnetic sensor; identify multiple pieces of second magnetic data, which are similar to each other at a predetermined level or higher, from among the multiple pieces of path data; determine an area range, in which the multiple pieces of second magnetic data are collected, to be an intersection area related to the multiple movements of the electronic device; determine a first space and a second space related to the multiple movements of the electronic device based on the intersection area; and determine a space, in which the electronic device is located, among the first space and the second space based on third magnetic data acquired using the magnetic sensor.

According to various embodiments, the processor may be configured to group multiple pieces of fourth magnetic data having mutually identical or similar first distribution characteristics with reference to the multiple pieces of second magnetic data among the multiple pieces of path data, and group multiple pieces of fifth magnetic data having mutually identical or similar second distribution characteristics, different from the first distribution characteristics, with reference to the multiple pieces of second magnetic data among the multiple pieces of path data.

According to various embodiments, the processor may be configured to determine an area range, in which the multiple pieces of fourth magnetic data are collected, to be the first space in a designated indoor space related to the collection of the multiple pieces of path data, and determine an area range, in which the multiple pieces of fifth magnetic data are collected, to be the second space within the designated indoor space.

According to various embodiments, the processor may be configured to collect the first magnetic data at each of multiple points on a path corresponding to a designated time interval, with regard to each of multiple paths regarding multiple movements of the electronic device, and generate a virtual marker for a point on the path, on which the first magnetic data has been collected, by using the first magnetic data.

According to various embodiments, the processor may be configured to generate the virtual marker by using a direction value of a magnetic field included in the first magnetic data.

According to various embodiments, the processor may be configured to generate a first index for the first space including multiple first virtual markers generated using the multiple pieces of fourth magnetic data, and generate a second index for the second space including multiple second virtual markers generated using the multiple pieces of fifth magnetic data.

According to various embodiments, the processor may be configured to compare the third magnetic data with at least one of the multiple first virtual markers and the multiple second virtual markers.

According to various embodiments, the processor may be configured to determine a space, in which the electronic device is located, to be the first space when the third magnetic data is similar to at least one of the multiple first virtual markers at a designated level or higher, and determine a space, in which the electronic device is located, to be the second space when the third magnetic data is similar to at least one of the multiple second virtual markers at a predetermined level or higher.

According to various embodiments, the electronic device may further include a display device, and a memory in which an application for supporting a location-based service is stored.

According to various embodiments, the processor may be configured to output a graphic user interface of the application including a geographic layout for a designated indoor space, by using a display device, and receive, through the graphic user interface, a first user input for designating multiple zones for collection of the multiple pieces of path data within the designated indoor space.

According to various embodiments, the processor may be configured to display the first space and the second space on the graphic user interface, by using the display device, receive a second user input related to user confirmation of the first space and the second space through the graphic user interface, and determine the first space and the second space in response to receiving the second user input.

According to various embodiments, the processor may be configured to display a list of at least one event to be provided when the electronic device is determined as being located in the first space or the second space, by using the display device, and in response to a third user input to the list, determine an event corresponding to the first space or the second space.

According to various embodiments, the electronic device may further include at least one of an acceleration sensor and a gyro sensor.

According to various embodiments, the processor may be configured to, when the movement of the electronic device is detected in at least one of the multiple zones by using at least one of the acceleration sensor and the gyro sensor, collect path data regarding a path on which the electronic device moves from a first time point at which the movement is detected to a second time point at which the detection of movement terminates.

A positioning method by an electronic device according to various embodiments may include: collecting multiple pieces of path data based on first magnetic data related to multiple movements of the electronic device by using a magnetic sensor; identifying multiple pieces of second magnetic data, which are similar to each other at a predetermined level or higher, from among the multiple pieces of path data; determining an area range, in which the multiple second magnetic data are collected, to be an intersection area related to the multiple movements of the electronic device; determining a first space and a second space related to the multiple movements of the electronic device based on the intersection area; and determining a space, in which the electronic device is located, among the first space and the second space based on third magnetic data acquired using the magnetic sensor.

According to various embodiments, the determining of the first space and the second space may include: grouping multiple pieces of fourth magnetic data having mutually identical or similar first distribution characteristics with reference to the multiple pieces of second magnetic data among the multiple pieces of path data; and grouping multiple pieces of fifth magnetic data having mutually identical or similar second distribution characteristics, different from the first distribution characteristics, with reference to the multiple pieces of second magnetic data among the multiple pieces of path data.

According to various embodiments, the determining of the first space and the second space may further include: determining an area range, in which the multiple pieces of fourth magnetic data are collected, to be the first space in a designated indoor space related to the collection of the multiple pieces of path data; and determining an area range, in which the multiple pieces of fifth magnetic data are collected, to be the second space within the designated indoor space.

According to various embodiments, the collecting of multiple pieces of path data based on the first magnetic data may include: collecting the first magnetic data at each of multiple points on a path corresponding to a designated time interval, with regard to each of multiple paths regarding the multiple movements of the electronic device; and generating a virtual marker for a point on the path, on which the first magnetic data has been collected, by using the first magnetic data.

According to various embodiments, the generating of the virtual marker may include: generating a first index for the first space including multiple first virtual markers generated using the multiple pieces of fourth magnetic data; and generating a second index for the second space including multiple second virtual markers generated using the multiple pieces of fifth magnetic data.

According to various embodiments, the determining of a space in which the electronic device is located may include comparing the third magnetic data with at least one of the multiple first virtual markers and the multiple second virtual markers.

According to various embodiments, the determining of a space in which the electronic device is located may further include: determining a space, in which the electronic device is located, to be the first space when the third magnetic data is similar to at least one of the multiple first virtual markers at a designated level or higher; and determining a space, in which the electronic device is located, to be the second space when the third magnetic data is similar to at least one of the multiple second virtual markers at a predetermined level or higher.

According to various embodiments, the collecting of multiple pieces of path data based on the first magnetic data may further include: outputting a graphic user interface including a geographic layout for a designated indoor space, by using a display device; and receiving, through the graphic user interface, a first user input for designating multiple zones for collection of the multiple pieces of path data within the designated indoor space.

According to various embodiments, the determining of the first space and the second space may include: displaying the first space and the second space on the graphic user interface, by using the display device; and receiving a second user input related to user confirmation of the first space and the second space through the graphic user interface.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 and/or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a sensor configured to sense a magnetic field;
   memory storing instructions; and
   at least one processor,
   wherein the instructions, when executed individually or collectively by the at least one processor, cause the electronic device to:
      collect multiple pieces of first path data based on at least a plurality of first magnetic data obtained during multiple movements of the electronic device in an indoor space by using at least the sensor, each of the multiple pieces of the first path data corresponding to a different path traveled by the electronic device;
      identify multiple pieces of second path data, which are similar to each other at a predetermined level or higher, from among the multiple pieces of the first path data;
      determine an intersection area in which each of the different paths corresponding to the multiple pieces of the second path data traveled by the electronic device at least partially overlap each other;
      determine a first space and a second space in the indoor space based on at least the intersection area and areas corresponding to the identified multiple pieces of second path data, wherein the intersection area is between the first space and the second space.

2. The electronic device of claim 1, wherein the at least one processor is further configured to group multiple pieces of fourth magnetic data having mutually identical and/or similar first distribution characteristics with reference to the multiple pieces of second path data among the multiple pieces of the first path data, and group multiple pieces of fifth magnetic data having mutually identical and/or similar second distribution characteristics, different from the first distribution characteristics, with reference to the multiple pieces of second path data among the multiple pieces of the first path data.

3. The electronic device of claim 2, wherein the at least one processor is further configured to determine an area range, in which the multiple pieces of fourth magnetic data are collected, to be the first space in a designated indoor space related to the collection of the multiple pieces of the first path data, and determine an area range, in which the multiple pieces of fifth magnetic data are collected, to be the second space within the designated indoor space.

4. The electronic device of claim 2, wherein the at least one processor is further configured to collect the first magnetic data at each of multiple points on a path corresponding to a designated time interval, with regard to each of multiple paths regarding multiple movements of the electronic device, and generate a virtual marker for a point on the path, on which the first magnetic data has been collected, by using at least the first magnetic data.

5. The electronic device of claim 4, wherein the at least one processor is further configured to generate a first index for the first space including multiple first virtual markers generated based on at least the multiple pieces of fourth magnetic data, and generate a second index for the second space including multiple second virtual markers generated based on at least the multiple pieces of fifth magnetic data.

6. The electronic device of claim 5, wherein the at least one processor is further configured to compare third magnetic data acquired via the sensor with at least one of the multiple first virtual markers and the multiple second virtual markers.

7. The electronic device of claim 6, wherein the at least one processor is further configured to determine a space, in which the electronic device is located, to be the first space when the third magnetic data is similar to at least one of the multiple first virtual markers at a designated level or higher, and determine a space, in which the electronic device is located, to be the second space when the third magnetic data is similar to at least one of the multiple second virtual markers at a predetermined level or higher.

8. A positioning method by an electronic device, the positioning method comprising:

collecting multiple pieces of first path data based on at least a plurality of first magnetic data obtained during multiple movements of the electronic device in an indoor space by using at least a sensor configured to sense a magnetic field, each of the multiple pieces of the first path data corresponding to a different path traveled by the electronic device;

identifying multiple pieces of second magnetic-path data, which are similar to each other at a predetermined level or higher, from among the multiple pieces of the first path data;

determining an intersection area in which each of the different paths corresponding to the multiple pieces of the second path data traveled by the electronic device at least partially overlap each other;

determining a first space and a second space in the indoor space based on at least the intersection area and areas corresponding to the identified multiple pieces of second path data, wherein the intersection area is between the first space and the second space.

9. The positioning method of claim 8, wherein the determining of the first space and the second space comprises:

grouping multiple pieces of fourth magnetic data having mutually identical and/or similar first distribution characteristics with reference to the multiple pieces of second path data among the multiple pieces of the first path data; and grouping multiple pieces of fifth magnetic data having mutually identical and/or similar second distribution characteristics, different from the first distribution characteristics, with reference to the multiple pieces of second path data among the multiple pieces of the first path data.

10. The positioning method of claim 9, wherein the determining of the first space and the second space further comprises:

determining an area range, in which the multiple pieces of fourth magnetic data are collected, to be the first space in a designated indoor space related to the collection of the multiple pieces of the first path data; and determining an area range, in which the multiple pieces of fifth magnetic data are collected, to be the second space within the designated indoor space.

11. The positioning method of claim 9, wherein the collecting of multiple pieces of path data based on at least the first magnetic data comprises:

collecting the first magnetic data at each of multiple points on a path corresponding to a designated time interval, with regard to each of multiple paths regarding the multiple movements of the electronic device; and generating a virtual marker for a point on the path, on which the first magnetic data has been collected, by using at least the first magnetic data.

12. The positioning method of claim 11, wherein the generating of the virtual marker comprises:

generating a first index for the first space including multiple first virtual markers generated using at least the multiple pieces of fourth magnetic data; and generating a second index for the second space including multiple second virtual markers generated using at least the multiple pieces of fifth magnetic data.

13. The positioning method of claim 12, wherein the determining of a space in which the electronic device is located comprises comparing third magnetic data acquired via the sensor with at least one of the multiple first virtual markers and the multiple second virtual markers.

14. The positioning method of claim 13, wherein the determining of a space in which the electronic device is located further comprises:

determining a space, in which the electronic device is located, to be the first space when the third magnetic data is similar to at least one of the multiple first virtual markers at a designated level or higher; and determining a space, in which the electronic device is located, to be the second space when the third magnetic data is similar to at least one of the multiple second virtual markers at a predetermined level or higher.

15. The positioning method of claim 8, wherein the collecting of multiple pieces of path data based on the first magnetic data comprises:

outputting a graphic user interface including a geographic layout for a designated indoor space, by using at least a display device; and receiving, through the graphic user interface, a first user input for designating multiple zones for collection of the multiple pieces of path data within the designated indoor space, and wherein the determining of the first space and the second space comprises:

displaying the first space and the second space on the graphic user interface, by using at least the display device; and receiving a second user input related to user confirmation of the first space and the second space through the graphic user interface.

16. The electronic device of claim 4, wherein the at least one processor is further configured to generate the virtual marker by using a direction value of a magnetic field included in the first magnetic data.

17. The electronic device of claim 1, wherein the electronic device further comprising:

a display device; and a memory in which an application for supporting a location-based service is stored, wherein the at least one processor is further configured to:

output a graphic user interface of the application including a geographic layout for a designated indoor space, by using the display device, and receive, through the graphic user interface, a first user input for designating multiple zones for collection of the multiple pieces of path data within the designated indoor space.

18. The electronic device of claim 17, wherein the at least one processor is further configured to display the first space and the second space on the graphic user interface, by using the display device, receive a second user input related to user confirmation of the first space and the second space through the graphic user interface, and determine the first space and the second space in response to receiving the second user input.

19. The electronic device of claim 17, wherein the at least one processor is further configured to display a list of at least one event to be provided when the electronic device is determined as being located in the first space or the second space, by using the display device, and in response to a third user input to the list, determine an event corresponding to the first space or the second space.

20. The electronic device of claim 17, wherein the electronic device further comprising:

at least one of an acceleration sensor and a gyro sensor, wherein the at least one processor is further configured to:

when the movement of the electronic device is detected in at least one of the multiple zones by using at least one of the acceleration sensor and the gyro sensor, collect path data regarding a path on which the electronic device moves from a first time point at which the movement is detected to a second time point at which the detection of movement terminates.

* * * * *